(12) United States Patent
Kläger et al.

(10) Patent No.: US 11,049,237 B2
(45) Date of Patent: Jun. 29, 2021

(54) METHOD AND DEVICE FOR OPTICAL EXAMINATION OF TRANSPARENT BODIES

(71) Applicant: SCHOTT SCHWEIZ AG, St. Gallen (CH)

(72) Inventors: Christian Kläger, Abtwil (CH); Andreas Wirth, Bühler (CH); Jürgen Thürk, Müllheim (DE)

(73) Assignee: SCHOTT SCHWEIZ AG, St. Gallen (CH)

( * ) Notice: Subject to any disclaimer, the term of this patent is extended or adjusted under 35 U.S.C. 154(b) by 62 days.

(21) Appl. No.: 16/264,092

(22) Filed: Jan. 31, 2019

(65) Prior Publication Data

US 2019/0164269 A1 May 30, 2019

Related U.S. Application Data

(63) Continuation of application No. PCT/EP2017/069259, filed on Jul. 31, 2017.

(30) Foreign Application Priority Data

Aug. 1, 2016 (DE) .......................... 102016114190.9

(51) Int. Cl.
*G06T 7/00* (2017.01)
*G01N 21/90* (2006.01)
(Continued)

(52) U.S. Cl.
CPC .............. *G06T 7/001* (2013.01); *G01B 11/24* (2013.01); *G01N 21/90* (2013.01); *G06T 5/003* (2013.01);
(Continued)

(58) Field of Classification Search
CPC .......... G06T 7/001; G06T 7/97; G06T 7/571; G06T 5/003; G06T 2207/20224;
(Continued)

(56) References Cited

U.S. PATENT DOCUMENTS 5,305,391 A 4/1994 Gomibuchi
5,987,159 A 11/1999 Nichani
(Continued)

FOREIGN PATENT DOCUMENTS

CN 103890568 6/2014
DE 69128336 3/1998
(Continued)

OTHER PUBLICATIONS

English translation of International Search Report for corresponding PCT/EP2017/069259 dated Sep. 21, 2017, 3 pages.
(Continued)

*Primary Examiner* — Jon Chang
(74) *Attorney, Agent, or Firm* — Ohlandt, Greeley, Ruggiero & Perle, L.L.P.

(57) ABSTRACT

A method and a device for optical examination of transparent bodies made of plastic, glass, or glass ceramic are provided. The examination is carried out by contactless detection and measurement of the body using optical imaging devices. For this purpose, a plurality of individual images are taken of the body during the examination in different positions relative to the imaging device, which are subsequently analyzed.

21 Claims, 2 Drawing Sheets

(51) Int. Cl.
*G06T 7/571* (2017.01)
*G06T 5/00* (2006.01)
*G01B 11/24* (2006.01)
*H04N 5/225* (2006.01)
*H04N 5/247* (2006.01)

(52) U.S. Cl.
CPC ................ *G06T 7/571* (2017.01); *G06T 7/97* (2017.01); *H04N 5/2256* (2013.01); *H04N 5/247* (2013.01); *G06T 2207/20224* (2013.01)

(58) Field of Classification Search
CPC ..... G06T 7/0002; G06T 7/0004; G01N 21/90; H04N 5/2256; H04N 5/247; G01B 11/24
See application file for complete search history.

(56) References Cited

U.S. PATENT DOCUMENTS

| | | | | |
|---|---|---|---|---|
| 6,067,155 | A * | 5/2000 | Ringlien | ............... G01N 21/21 356/240.1 |
| 2004/0117055 | A1* | 6/2004 | Seidel | ............... H01L 21/67225 700/121 |
| 2004/0184675 | A1* | 9/2004 | Brown | .................... G06T 5/003 382/279 |
| 2006/0098191 | A1 | 5/2006 | Ringlien | |
| 2006/0140470 | A1* | 6/2006 | Watanabe | .............. G01B 11/12 382/142 |
| 2006/0208172 | A1 | 9/2006 | Akkerman | |
| 2009/0317895 | A1* | 12/2009 | Kiyota | ................... C12M 23/12 435/286.4 |
| 2013/0107249 | A1 | 5/2013 | Kohler | |
| 2015/0308964 | A1 | 10/2015 | Schorn | |
| 2017/0345141 | A1* | 11/2017 | Vivet | ................. G01N 35/1016 |

FOREIGN PATENT DOCUMENTS

| | | |
|---|---|---|
| DE | 602004008229 | 5/2008 |
| DE | 102011100146 | 10/2012 |
| DE | 102012016342 | 5/2014 |
| DE | 102015218356 | 3/2017 |
| EP | 1657587 | 5/2006 |
| JP | S61294818 | 12/1986 |
| JP | S63222246 | 9/1988 |
| JP | 2005201895 | 7/2005 |
| JP | 2009128261 | 6/2009 |

OTHER PUBLICATIONS

English translation of Written Opinion for corresponding PCT/EP2017/069259 dated Sep. 21, 2017, 6 pages.
English translation of International Preliminary Report on Patentability for corresponding PCT/EP2017/069259 dated Sep. 21, 2017, 8 pages.

* cited by examiner

METHOD AND DEVICE FOR OPTICAL EXAMINATION OF TRANSPARENT BODIES

CROSS REFERENCE TO RELATED APPLICATIONS

This application is a continuation of international application PCT/EP2017/069259 filed Jul. 31, 2017 which claims benefit under 35 USC § 119 of German Application 102016114190.9 filed Aug. 1, 2016, the entire contents of both of which are incorporated herein by reference.

BACKGROUND

1. Field of the Invention

The present invention relates to a method and to a device for optical examination of bodies, preferably transparent bodies made of plastics, glass, or glass ceramics. The examination is carried out by contactless detection and measurement of the body using optical imaging devices.

2. Description of Related Art

Contactless acquisition of information about diverse types of bodies is of great interest in many fields of science and technology. There is a great variety of applications ranging from geometric detection to the inspection of surfaces of technical products. Non-contact or contactless optical inspection of technical products plays an important role in manufacturing, especially for quality assurance.

For example, this aims to detect geometric deviations from an ideal nominal shape, such as bulges or depressions, but also local defects on the surface or within the material volume, such as pores, scratches, grooves, chipping, burrs, etc. Furthermore it is intended to be able to identify adhering or sticking foreign bodies or foreign material such as dust, lint, drops, shavings, splinters or other contaminations.

In the case of bodies that mostly reflect, absorb or scatter the employed radiation or waveform, it is possible to obtain information about their surface shape in this way. If the radiation penetrates into the object and is reflected, absorbed or scattered on structures in the interior thereof, it is possible to additionally obtain information about the full three-dimensional internal structure and about the surface shape. So, three-dimensional information about the object can be generated. In this way it is even possible to detect unwanted defects in the volume, such as voids, bubbles, cracks, or trapped foreign material.

Shape fidelity and absence of defects play a major role in mastering fabrication processes and quality assurance. In particular non-destructive, non-contact three-dimensional examination methods can have a high utility value here. On the basis of existing three-dimensional measurement data, further quality decisions can be derived.

Such methods are particularly beneficial for inspecting bodies made of plastics or glass. For example, the outer contours of a glass body can be detected by appropriate three-dimensional examination methods, and can be compared with an ideal nominal shape. In this way, surface defects such as scratches, local shape deviation, or adhering particles or glass crumbs can be seen. Three-dimensional measurement moreover enables to detect features in the interior of glass bodies. This is of particular interest for the detection of glass defects such as foreign material, inclusions and bubbles. It is also interesting, whether the feature is located above or below the surface, that is to say whether it is adhering to or located within the glass.

For example, DE 10 2004 047 928 B4 describes a method for three-dimensional measurement of surfaces of an object, wherein an optical imaging device captures an image stack comprising a plurality of images. The individual images of the image stack are offset from each other in their Z-direction. In order to obtain a large Z-resolution, a very small focus depth is employed. From the individual images of an image stack, those pixels are then picked out which are sharp within the focus depth. Due to the small depth of focus of an individual image it is possible to measure an object's surface within a single measuring cycle by evaluating the sharpness information.

An inspection method for glass containers is known, for example, from document DE 10 2012 016 342 A1, which comprises an illumination device arranged in the interior of the glass container.

From document DE 10 2011 100 146 A1, a further method is known which discloses a three-dimensional measurement of objects made of glass.

A drawback of the prior art devices and methods is that defects in the optical system, i.e. in the area of the imaging device, can be interpreted as defects in the glass product. The methods are not adapted to distinguish whether the cause of a defect is in the area of the optical system or in or on the examined body. This means specifically, for example, that it is not possible to distinguish whether an adhering lint is located on the body or on the lens of the imaging device.

Therefore, it is not possible to distinguish interferences or functional impairments of the associated optical inspection device from defects related to the body to be examined.

Clouds in the glass, for example, may be a contamination of the glass and in this sense are defects that are causally related to the body to be examined.

This inadequate distinction means that the defects analyzed on the glass product have to be significantly greater than the interferences in the system. However, if the accuracy of the imaging system is intended to be enhanced, this is only possible by reducing interferences in the overall system.

An increase in the accuracy of the method to the order of magnitude of the variations in the glass surface is not possible, since even with a perfect inspection system such interferences would still be interpreted as defects. Therefore, an improvement in the accuracy of the examination is hardly possible without simultaneously causing a higher false reject caused by interferences in the device itself.

Further drawbacks arise from the fact that further analyzing of defects, for example of the number of defects, is difficult to achieve, and also that the analyzing of certain defects is possible only with reduced probability, for example of cracks which are only visible under specific angles.

SUMMARY

The invention is therefore based on the object to provide a method and a device for optical examination of transparent bodies while avoiding the drawbacks mentioned above.

It is in particular intended to achieve an increase in accuracy of the measurement and hence in the examination. Furthermore, the method should allow to distinguish between defects related to the body to be examined and interferences of the measurement system.

The invention accordingly relates to a method for optical examination of bodies, preferably of transparent bodies, involving at least one optical imaging device and a computer unit and in particular the use of an optical imaging device and a computer unit. In addition, an illumination device may be provided and used in the method to illuminate the body to be examined.

For the examination, the body is positioned with its area to be examined within the capture range of the imaging device during the examination. The area to be examined may comprise the entire body, or else portions thereof such as the bottom or lateral surfaces.

The body is rotated about an axis of rotation during the examination, and while being rotated, a plurality of at least partially overlapping individual images of the body are captured using the imaging device. The rotation is preferably performed continuously, although discontinuous rotation is possible as well.

The capturing of an individual image of the body occurs at a specific rotational position of the body with respect to the optical imaging device in each case. Thus, the time of capturing an individual image is defined by a predetermined rotational position that defines the orientation of the body with respect to the imaging device. The individual image is transmitted to the computer unit as a digital image, for evaluation. For this purpose, the computer unit is advantageously equipped with an image analysis function which makes it possible to perform an analysis of digital images on the basis of stored defect information, for example in a defect feature database. In addition it is possible to transmit, to the computer unit, the capture time of an image and/or the rotational position, in order to obtain additional information for the image analysis.

In detail, the method comprises the following steps:
a) generating a first individual image of the body and transmitting it to the computer unit as a digital image, said image being used as a reference image;
b) rotating the body about a predetermined angle of rotation until reaching a predetermined subsequent rotational position;
c) generating a subsequent further individual image of the body at this rotational position, and transmitting the second individual image to the computer unit as a further digital image;
d) computationally comparing the reference image with the further image by subtracting the images to produce a difference image;
e) computationally developing the difference image by unfolding, preferably cylindrical unfolding;
f) analyzing the unfolded difference image, by the computer unit;
g) repeating the above steps b) through f) while taking the respective further image as a reference image until at least one complete revolution of the body has been completed.

For the purposes of the invention, therefore, a respective further individual image is captured after a predetermined angle of rotation and when reaching the predetermined rotational position, and is compared with the previous image as a reference image. The second individual image is thus used as a new reference image in each repletion of the steps.

The method is therefore based on comparing two respective individual images or the associated digital images of the body that were captured at successive rotational positions. Ideally, the method is performed until the body has completed at least one complete revolution with respect to the position of the imaging device so that the entire area of the body to be examined has been located at least once within the capture range of the imaging device. Hence, the sum of the angles of rotation is therefore at least 360° in total, so that the body is captured circumferentially, from different viewing positions.

The generating of the images is preferably already done digitally in order to simplify the subsequent evaluation. Otherwise, the images may be digitized before being transmitted to the computer unit.

The images may be stored in the computer unit. For reasons of higher processing speed, this may be done particularly favorably directly in the RAM. Storage on other storage media is of course possible as well.

In an alternative embodiment, it is also possible to keep the body stationary and to rotate the imaging device around the body. For this purpose, it is possible as well to provide a plurality of imaging devices which are arranged at different positions relative to the body.

The illumination device may be arranged circumferentially in this case, for example, or may be rotated simultaneously. However, such an arrangement would usually be more complex, and therefore preference is given to the above-mentioned embodiment with rotating body and stationary imaging device and/or illumination device.

The comparing of a first image and a subsequent second image of the body at two different successive rotational positions may be achieved particularly favorably by computational subtraction of these two generated images. This means that only those information from the two images are retained for further evaluation, which are not identical. The image obtained by the subtraction is also referred to as a difference image in the present context.

A difference image generated in this way can be unfolded by known methods. The unfolding is based on the geometry of the object. In the case of at least partially rotationally symmetric bodies, the images can be unfolded cylindrically. Hence, the image is preferably unfolded cylindrically. The unfolded image or difference image can be analyzed for defects using the image analysis function.

The method permits to detect and identify different defects. Moreover, it is also possible to differentiate during the examination as to whether the cause of the defect is related to the optical system or its surroundings, or else is located in or on the body being examined. This allows to distinguish, for example, whether a particle, such as a speck of dust or a lint, is located on the body or on a component of the optical system such as the lens, or whether it was present in the air space between the body and the imaging device at the moment of image capturing. For defects that are caused by the examined body it is possible to discriminate whether the defect is on the surface facing the imaging device or on the surface facing away from imaging device or inside the volume of the body.

For example, with the method according to the invention, a particle located in the area of the optical system, such as a speck of dust adhered to the lens, will always be present at the same position in the image in successive at least partially overlapping individual images of the body. Due to the computational elimination of identical image components in two consecutive images, this particle will then no longer appear in the difference image. Thus, the difference image is an image corrected for this system defect, which can now be analyzed using standard computer-assisted methods.

In preferred embodiments it is thus possible, for analyzing the difference image, to eliminate, from the differential image, features which appear at the same position in successive images.

This allows to enhance the accuracy of the examination, since interferences in the overall system can be reduced or even completely eliminated. In this way, it is possible to minimize system-related false rejects during the examination and to significantly improve the efficiency of the optical examination method.

The method of the invention furthermore allows to reliably detect even defects that cannot be identified with conventional examination methods or only with increased uncertainty, for example cracks that are only observable from specific angles. It is in particular possible to distinguish system-related defects from those located within the range of the body.

For evaluation, advantageously, the rotational velocity of the body relative to the imaging device is used. On the basis of the rotational velocity of the body and its geometric dimensions it is possible to determine information about the exact location of the defect within the range of the body.

For example, a defect on the outer lateral surface of the body may exhibit a lateral offset on two successive images of the generated images, i.e. it will not appear at the same position in the images. From the lateral offset and the time interval between the two images it is possible to computationally determine the velocity of the defect caused by the rotation of the body, which approximately corresponds to the trajectory velocity of the defect at the corresponding position of the body. On this basis it is possible to determine the distance to the axis of symmetry of the body and hence the trajectory of the defect position. Based on the trajectory of the defect position or the radial distance to the axis of symmetry of the body it is then possible to determine, in conjunction with stored geometrical data of the body, whether the defect position is located on the outer lateral surface, for example, or in the volume, or on the inner surface of the body.

Advantageously, therefore, successively taken individual images of the body have an overlap.

For identifying the aforementioned defects the best possible, a large overlap may be favorable, so that the lateral offset of the defect will be rather small in successive images.

As a result, the dimension of a defect is better identifiable, since the length of a defect, for example, can be computationally eliminated from the lateral offset thereof in successive difference images.

In a preferred embodiment, the body has a rotationally symmetrical shape, at least in portions thereof. In this case, the body can be rotated about its axis of symmetry, so that the distance to the illumination device and/or to the imaging device can be kept identical while being rotated. In the case of rotationally symmetrical bodies or at least partially rotationally symmetrical bodies, the axis of rotation advantageously coincides with, i.e. is aligned with the axis of symmetry of the body.

In this way, the capturing of the images and the analysis of the images can be simplified, since the rotational velocity of the body's surface can be very easily determined and included in the evaluation. The movement velocity of the defect can then be evaluated on the basis of the lateral offset in relation to the rotational velocity of the body.

The body may be made of a transparent material, comprising plastic, glass, in particular borosilicate glass, or glass ceramic. The method may also be applied to non-transparent materials, and in this case it may advantageously be operated in reflection mode.

Suitable bodies may include solid material, such as rods or rod portions, but may also have a hollow shape, such as tubes or tubular portions. The method is particularly suitable for the examination of packaging means, canisters, or containers to which very high requirements are imposed in terms of contamination, and where at the same time the material of the packaging means itself should also be of high quality.

This applies, for example, to pharmaceutical packaging means such as syringes, cartridges, vials, or ampoules, but also to containers for perfumery products, for example. Pharmaceutical packaging means made of glass, in particular borosilicate glass, can be examined very well with the method according to the invention. However, other bodies, such as containers, tubes or rods made of plastic or glass ceramic, can be examined as well using this method.

Bodies that have a cavity are preferably empty during the examination so as to not introduce any additional possible error sources into the examination that would complicate the examination. Such error sources could be air bubbles, for example, that are present in the substance contained in the volume.

The optical imaging device is configured as an imaging optical system. The imaging device is adapted to capture a two-dimensional image of a surface in the object space. The imaging works in a similar way to optical imaging by means of lenses, and the underlying principle can also be transferred to other wavelength ranges of the electromagnetic spectrum or to other types of waves such as acoustic waves.

Accordingly, bodies that are transparent or have a high transparency to the wavelength of the imaging device may also be considered as transparent bodies in the sense of the invention.

The imaging device typically comprises an image sensor and an imaging component. The imaging device is able to capture the surface within the object space in two dimensions and to convert incident radiation into electrical signals. The sharply imaged surface is also referred to as focal plane.

Mostly, the digital image is divided into individual picture elements (pixels). In specific embodiments, for example if information about the location dependency in a coordinate can be dispensed with, the imaging device may be configured as a one-dimensional line camera. In the present case, two-dimensional imaging devices are helpful.

Image sensors may comprise matrix cameras based on CCD or CMOS chip technology, for example. With upstream converters (e.g. scintillator plates, fluorescent layers, up-conversion materials, etc.), they can even be used to detect wavelength ranges or other radiation for which the respectively employed chips are not sensitive. Furthermore, the image sensors may also comprise IR cameras, bolometers, InGaAs cameras, or HgCdTe cameras.

The imaging is effected using a component that will be referred to as an objective lens below. In the case of electromagnetic radiation in the range of wavelengths from ultraviolet to infrared radiation, an objective lens typically consists of one lens or of a combination of lenses. However, the same imaging function may be achieved by other components, for example by zone plates or Fresnel lenses. In special cases it is also possible to produce two-dimensional images with a scanner technique.

For evaluation, the image data are transmitted to an electronic computer unit in which the information transmitted by the imaging device can be stored. The image information may additionally comprise a location-dependent depth information, which can be determined on the basis of the distance between the body and the imaging device and the sharpness level.

Digitization of the signals as generated by the image sensor can be achieved according to the prior art, both in the imaging device itself and in the evaluation unit. So it is possible to implement required image analysis algorithms in the form of permanently programmed or freely programmable software.

The body is arranged so that the area to be examined is preferably located in the focal plane of the imaging device, i.e. in the capture range, in order to be able to detect the defects sharply.

By choosing the depth of focus of the imaging device, it is possible in preferred embodiments of the inventive device to selectively adjust whether the entire body is imaged sharply or only a portion of the body such as, for example, the front side or wall of the body facing the imaging device.

In a first embodiment, the depth of focus of the imaging device focused on the body is at least 1 cm, preferably at least 3 cm, and most preferably at least 10 cm. By selecting this rather large depth of focus, it is generally possible to sharply image and analyze defects on the front side of the body facing the imaging device as well as on the rear side of the body facing away from the imaging device. However, the computational evaluation of the obtained images requires rather high computing power of the evaluation unit, since there will be more defects on the images in total and it is necessary to distinguish between defects on the front and the back sides. The distinction between defects on the front and the back sides may be made on the basis of their direction of movement during rotation of the body.

For hollow bodies with a given wall thickness of the body, it is possible according to a further embodiment to select the depth of focus of the imaging device focused on the body such that a ratio of the depth of focus to the wall thickness of the body is less than 5, preferably less than 2, most preferably less than 1.5. With such a setting of the depth of focus, only the front wall of the hollow body can be imaged sharply, the rear wall will already be hidden optically. This allows to significantly reduce the computation required for the evaluation, especially since a distinction between defects on the front and the back sides is eliminated. Furthermore, no overlap of defects on the front and back sides can occur, as it may otherwise happen in the case of a very large depth of focus at certain angles of rotation. The front of the body can therefore be viewed separately.

Alternatively, in a further embodiment of the inspection device, the depth of focus of the imaging device focused on the body is less than 1 cm, preferably less than 0.5 cm, most preferably less than 2 mm.

So, both the choice of a low depth of focus with respect to the body to be analyzed and the choice of a large depth of focus have different advantages and may be preferred depending on the available computing power of the evaluation unit and the desired scope of the analysis.

For thick-walled components it is also possible to capture multiple circumferential series of images with a different distance between the body and the imaging device or with a focal plane different in the direction of the optical axis, in order to be able to sharply image different depth regions of the body in this way.

In a preferred embodiment, the body rotates during the examination. For this purpose, a suitable rotating device may be provided, for example a turntable, which allows the body to be rotated continuously during the examination. Thus, the imaging device and/or the illumination device can be kept largely stationary, which generally implies a simpler setup.

However, rotations may as well be realized by rotating the imaging device, or a virtual rotation may be achieved by a plurality of imaging devices arranged at angular increments.

The rotational velocity is chosen and brought in accordance with the trigger parameters of the imaging device such that it is possible to capture sharp images of the body in the focal plane. Thus, the rotational velocity of the body is matched with the image acquisition rate of the imaging device. Another criterion is the triggering time, i.e. the time that elapses between two successive images. This is often system-dependent due to the optical system.

Accordingly, the image acquisition rate, i.e. the number of images captured per unit time, which depends on the rotational velocity of the body, is selected such that on the one hand the body appears as sharp as possible in the focal plane, but on the other hand the duration of the examination is not too long. In general, imaging devices with an image acquisition rate of about 10 frames per second or more prove to be useful for this purpose to allow for a sufficiently high rotational velocity.

In order to achieve complete imaging of the body by the difference images, with a sufficient overlap, it is helpful to capture a certain number of successive images during one complete revolution of the body. During a 360° rotation of a body that has a diameter of 5 mm or more, at least 36 images should therefore be taken, which means that a first rotational position differs from a subsequent rotational position by 10°. The angle of rotation of the body accordingly changes by 10° per image in relation to the imaging device so that the first individual image is captured at 0° and the second one at 10°. Even more accurate information can be obtained if the angle of rotation of the body between a first image and a subsequent image changes by not more than 5°, preferably not more than 2°, and most preferably by not more than 1°. This is especially favorable for larger bodies having a diameter of about 20 mm or more.

Due to the continuous rotation of the body during the capturing of the images and depending on the rotational velocity, blurring artifacts known a 'motion blur' effect may occur. For generating the difference image, such effects can be computationally eliminated with suitable algorithms in order to improve the evaluation. It is therefore advantageous to computationally eliminate motion blur from the image for the defect analysis.

Furthermore, an illumination device comprising a suitable beam source may be provided, which may emit electromagnetic radiation in the visible wavelength range and/or in the near IR and/or in the near UV range. For the purposes of the invention, the wavelength detectable by the imaging device is matched to the wavelength of the beam source.

The beam source may be arranged such that examination is possible in the reflected light mode or in the transmitted light mode. Also, multiple beam sources may be used for this purpose. For example, a beam source may be arranged such that the body is located between the beam source and the imaging device, for capturing the body in the transmitted light mode when illuminated. A further beam source may then be arranged close to the imaging device, for example, for capturing the body in the reflected light mode when illuminated. The beam sources may as well be configured for being switched on or off individually during the examination.

In this way, they may be switched on and then off again for an individual image, for example by the computer unit. Alternating operation is conceivable as well, for example the capturing of a first circumferential series of images with a first setting of the illumination, for instance for images in the reflected light mode, and a second setting of the illumination for a second circumferential series of images, for example for images in the transmitted light mode.

Preferably, for analyzing the differential image, the lateral offset of a feature in successive images in relation to the rotational velocity of the body is evaluated.

In particularly preferred embodiments of the method, the rotational angle of the body between two successive rotational positions is not more than 20°, not more than 10°, preferably not more than 5°, more preferably not more than 2°, and most preferably not more than 1°.

Method for optical examination as disclosed herein, wherein the body is rotated continuously during the imaging.

Preferably, the beam source being a component of the illumination device emits monochromatic radiation, so that defects that appear dark in the captured image, such as particles, can be detected with high contrast. The illumination may also be adapted so as to be diffuse for this purpose. The beam source may also emit or radiate white light.

According to one embodiment of the invention it is also possible to expose the body to different radiation and to examine it at different wavelengths, in order to be able to capture IR images, for example, in addition to grayscale or color images.

For each captured image, the computer unit may simultaneously store information about the capturing time. In this case, information about the rotational position and the distance between the body and the imaging device are computationally stored at each point in time at which the imaging device captures an image.

Defects, for example surface damage such as scratches or cracks, but also defects in the volume, such as trapped bubbles in glass or glass ceramic bodies, will cause light/dark deviations in the captured image. This will cause differences between adjacent pixels or pixel areas in the digital image or in the generated difference image, and such differences can be analyzed computationally using suitable algorithms.

In this manner it is possible to identify defects in the body, but also deviations from a predefined nominal contour. Also, information about the spatial extent of a defect can be obtained in this way, for example about the position, length, width and/or depth of a scratch or crack.

It is also possible to identify defects below the surface of the body, such as streaks trapped in the material volume, closed bubbles or enclosed foreign particles. In the evaluation, information about the position of the defect on or in the body and its spatial extent can be calculated.

Accordingly, in a further aspect, the invention furthermore includes an inspection device for optically examining a body, preferably a transparent body, comprising an optical imaging device and a computer unit for carrying out an optical examination as described above. Furthermore, at least one illumination device may be provided for illuminating the body. Conveniently, a receiving means for placing and holding the body to be examined is furthermore provided, which may be in the form of a rotating device. This may be a turntable, for example, on which the body can be placed and which performs the rotational movement.

In the preferred embodiments, the described inspection device for optical examination is therefore configured to perform the steps of:

a) generating a first individual image of the body and transmitting it to the computer unit as a digital image, this image being used as a reference image;
b) rotating the body about a predetermined angle of rotation until reaching a predetermined subsequent rotational position;
c) generating a subsequent further individual image of the body at this rotational position, and transmitting the second individual image to the computer unit as a further digital image;
d) computationally comparing the reference image with the further image by subtracting the images to produce a difference image;
e) computationally developing the difference image by unfolding;
f) analyzing the unfolded difference image, by the computer unit;
g) repeating the above steps b) through f) while taking the respective further image as a reference image until at least one complete revolution of the body has been completed.

BRIEF DESCRIPTION OF THE DRAWINGS

The invention will now be explained in more detail with reference to the accompanying figures, wherein.

DETAILED DESCRIPTION

Figure 1:
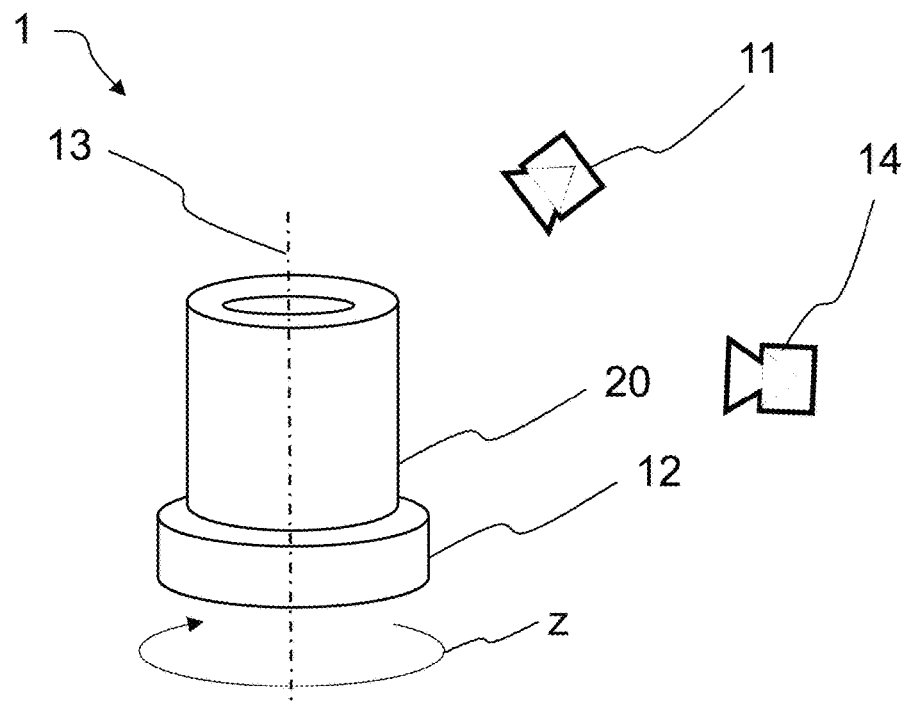
FIG. 1 schematically shows a portion of an inspection device for optical examination in an oblique view.

In the following detailed description of preferred embodiments, the same reference numerals designate substantially similar components in or on these embodiments, for the sake of clarity. However, for a better understanding of the invention, the preferred embodiments illustrated in the figures are not always drawn to scale.

FIG. 1 schematically shows a portion of an inspection device designated by reference numeral 1 as a whole, for optical examination and inspection of bodies.

The invention provides an inspection method and an inspection device for quality control of transparent bodies which preferably have a rotationally symmetrical shape. It is particularly useful for the examination of transparent bodies made of plastic, glass, or glass ceramics, which may be solid as well as hollow.

Preferably, these may be pharmaceutical containers or packaging means, such as glass syringes or glass ampoules. During the inspection, the body to be examined is rotated about an axis of rotation, and an imaging device captures the entire surface of the body by taking a plurality of successive individual images, by the imaging system, at different angular increments of the body.

The number of individual images per angular increment or the total number of individual images for a complete revolution of the body about its rotational axis is chosen such that the successive individual images overlap in order to obtain overlapping information.

Here, the overlapping information is used to provide additional information for the evaluation, in particular to be able to digitally suppress interfering background information, such as noise, reflections, or impurities. Defects related to the rotation can be distinguished from those not related to a rotation.

In this way it is possible to distinguish impurities of the inspection device from defects of the glass body. On the basis of the rotation direction it is furthermore possible to distinguish whether a defect is located on the front side or on the rear side of the body. Thus, double evaluations can be avoided. Finally, further information about the defect can be obtained from an analysis of the rotational velocity of the body, for analyzing the extent or type of the defect.

The inspection device 1 enables to optically capture the body to be examined using an imaging system, for examining the body for possible defects or imperfections.

In the example shown in FIG. 1, the body to be examined is a portion of a glass tube 20. The body is rotationally symmetric with respect to its axis of symmetry 13 which at the same time serves as a rotation axis during rotation. Rotation occurs in the direction of rotation indicated "Z", although the opposite direction would, of course, be eligible as well.

The inspection device 1 comprises a receiving means, preferably a rotating device for rotating the body, in the present example a turntable 12 for holding and positioning the body 20, on which the body 20 is placed for inspection such that the axis of symmetry of the body 20 is aligned with the axis of rotation of the receiving means.

Furthermore, the device comprises at least one optical imaging device 14 which, in the present example, is arranged such that it can capture a portion of the lateral surface of the body during rotation. In this case, the imaging device 14 is arranged such that the portion of the body 20 to be examined is within the capture range of the imaging device 14. In the example, this is the portion of the lateral surface of body 20. The imaging device 14 may, of course, also be arranged differently, for example so as to examine the bottom or the transition area between the bottom and the lateral wall. It is also possible to simultaneously use a plurality of differently arranged imaging devices 14, each one capturing a particular area of the body, and the subsequent analysis may then be performed on the generated images of each imaging device.

The imaging device 14 comprises an image sensor with a matrix camera or a multi-line camera. The optical system of imaging device 14 comprises further optical components, such as lenses, which are not shown, for the sake of clarity.

A great advantage of rotationally symmetric bodies is that during rotation about the axis of symmetry 13 a constant distance can be maintained between the surface of the body and the imaging device 14, so that when the imaging device is appropriately focused on the lateral surface of the body 20, this surface can be captured with the same sharpness in all images.

Furthermore, an illumination device 11 is preferably provided for illuminating the body during the examination, and in the present example it emits monochromatic light onto the body. The beam source of illumination device 11 is arranged on the same side as the imaging device 14, as seen from the body 20. In this way it is possible to capture images in the reflected light mode.

Of course, other arrangements of the illumination device are possible as well. In the case of hollow walled bodies that have an opening at the top, it is conceivable, for example, to have an illumination means arranged in the cavity of the body and protruding through the opening into the body from above. Also conceivable is an illumination means that is arranged on the side of the body opposite to the imaging device 14 so as to emit radiation towards the imaging device. In this case, analysis is feasible in the transmitted light mode.

During the capturing of the individual images, the body 20 rotates continuously about the axis of rotation 13. The body is spaced with respect to the imaging device such that the focal plane of the imaging device at least touches or intersects the lateral surface of the body.

In the example shown in FIG. 1, the body is a hollow body with a lateral wall.

In order to be able to moreover capture defects in the volume of the body and on the inner surface thereof in a sufficiently clear manner using an imaging device, it is possible to use an imaging device with a greater depth of focus in this example. Ideally, for hollow bodies, the depth of focus is selected depending on the volume of the body to be examined and on the thickness of the lateral wall such that, preferably, the entire volume of the body in the capture range can be imaged sharply.

According to another embodiment, however, it is also possible to use an imaging device that has a smaller depth of focus, for example in order to save computing time or in cases where only portions of the body are intended to be analyzed, for example an outer surface.

Figures 2, 3:
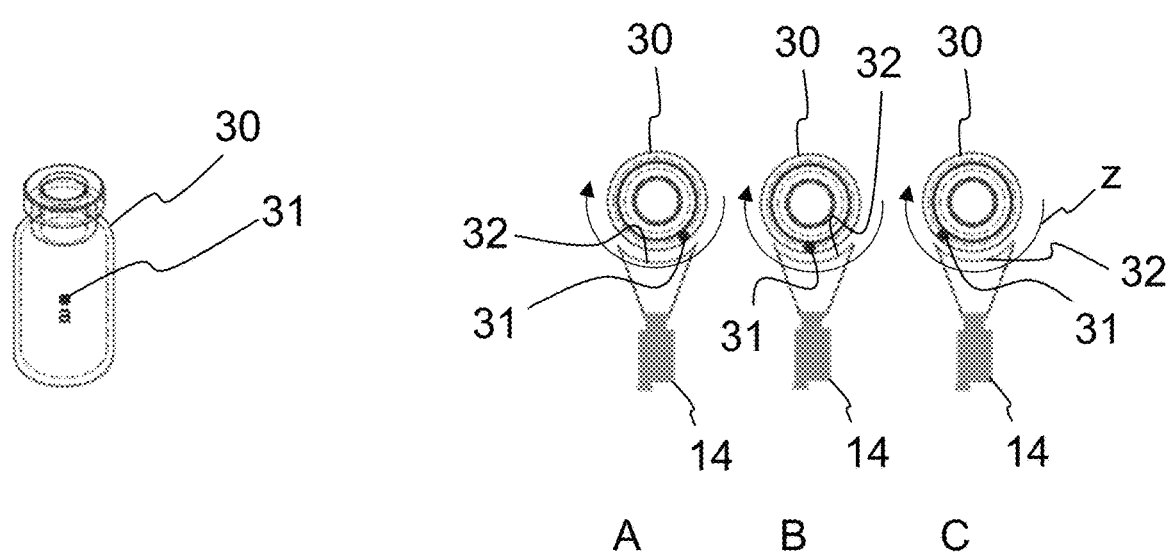
FIG. 2 shows a pharmaceutical packaging means made of glass in an oblique view.
FIG. 3 schematically shows the capturing of a defect during a rotation by an imaging device, in a plan view.

FIG. 2 shows, by way of example, a transparent pharmaceutical packaging means, in the example a container, more particularly a vial 30 made of borosilicate glass, in an oblique view. The vial 30 has a defect 31 which in this example is located on the lateral surface of the vial 30. Here, this is a particle adhering on the surface. Similarly, however, it might also be a defect located in the volume of the glass body, such as a foreign particle inclusion in the glass or an enclosed bubble located in the volume.

FIG. 3 schematically shows a plan view of three different arrangements of a body 30 and an imaging device 14 relative to each other for capturing three successive images. In these setups, the arrangement relative to each other differs due to a rotation of the body 30 in a direction indicated by "Z", so that the orientation of the body relative to the imaging device is different in each case.

The imaging device 14 is arranged such that the area of the lateral surface to be examined of the body 30 is within the capture range 32 of the stationary imaging device 14. For the sake of clarity, the illumination device is not illustrated.

During rotation, the imaging device captures images of the body 30, while the rotational position, i.e. the orientation of the body 30 with respect to the imaging device 14, is changing in each case. In the example shown, three different rotational positions are designated by letters "A", "B", and "C".

At the rotational position designated by "A", the defect 31 is located on the right-hand side of the capture range 32 of the imaging device 14 and hence in a right-hand portion of the image, viewed in the image capturing direction along the optical axis. In this rotational position, a first image is generated by the imaging device 14. After rotation of the body 30 by about 30°, the defect 31 on the lateral surface has also been rotated and is located at a rotational position designated by "B", approximately in the center of the image field. After another rotation by about 30°, the defect 31 is approximately located in a left-hand portion of the image.

According to the invention, an image is taken at each of the three rotational positions "A", "B", and "C". By comparing two successively captured images, i.e. the images taken at rotational positions "A" and "B" and the images taken at "B" and "C", two difference images can be generated in this way. Since the defect 31 is associated with the body 30, its position on each generated image will be different due to the rotation of the body 30.

Since, for generating the difference image, only that information is used which is different on the respective successive images, this defect 31 will be imaged on the two associated difference images as well and can be detected by suitable analysis methods.

In the example shown, only three images are generated in total for an angular range of about 60° (about 30° between rotational positions "A" and "B" and also between rotational positions "B" and "C"), which is essentially for the sake of clearer presentation.

It has been found that a significantly shorter image sequence with smaller angles of rotation between two successive rotational positions leads to significantly better examination results with higher evaluation accuracy, since it is possible to more accurately determine geometric information about the defect, such as the exact length of a crack. Sufficient overlapping can generally be achieved with angles of rotation of not more than 30°, not more than 20°, not more than 10°, preferably not more than 5°, more preferably not more than 2°, and most preferably not more than 1°.

Figure 4:
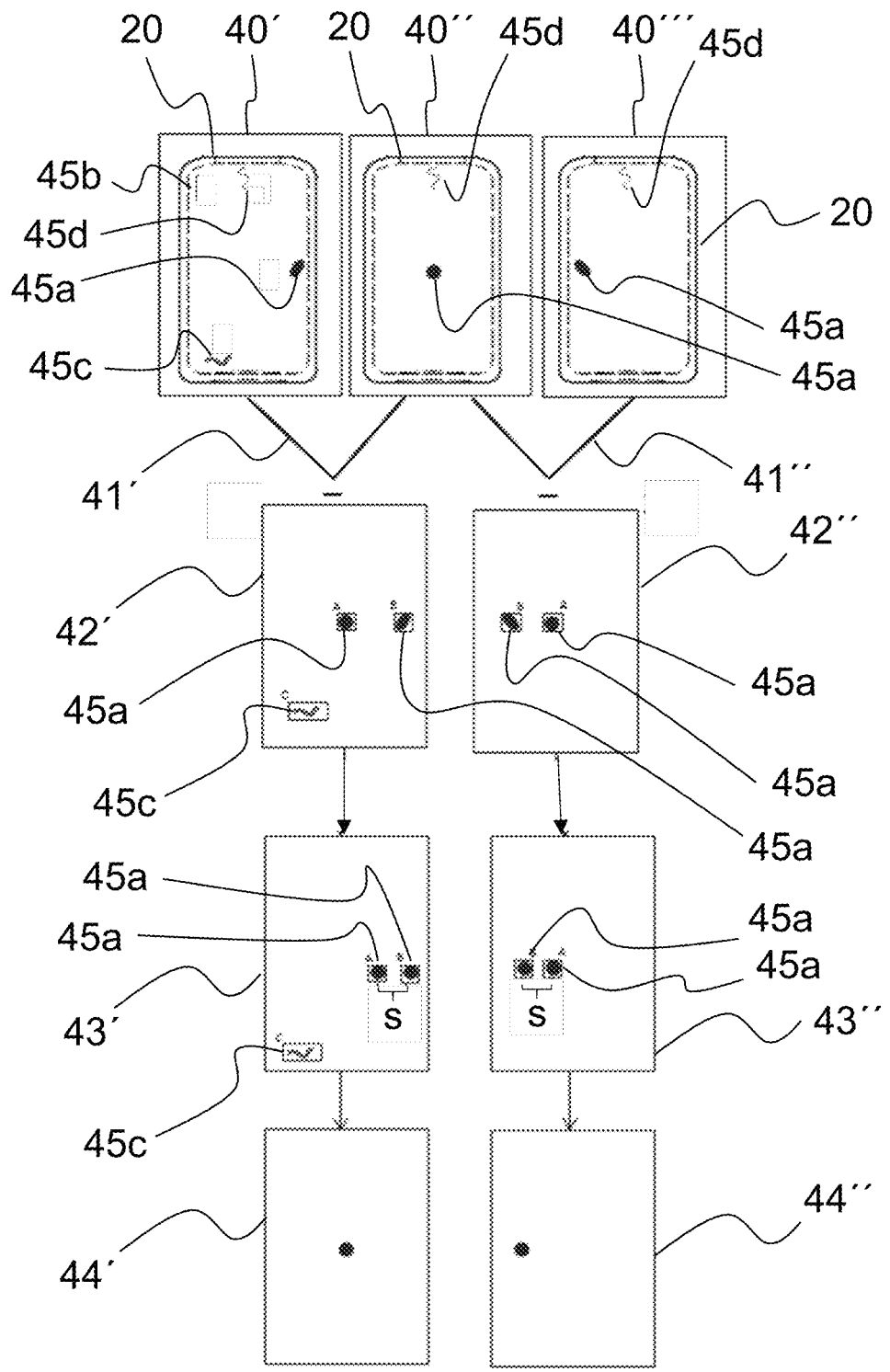
FIG. 4 schematically shows an examination procedure of a pharmaceutical packaging means made of glass, with different defects.

Finally, FIG. 4 schematically illustrates an exemplary examination procedure on the basis of three successively captured images of a pharmaceutical packaging means 20 made of glass, which has an inner volume, with different defects. These defects are partly related to the body 20 to be examined, but partly also to the optical system or the environment.

As explained in the example illustrated in FIG. 4, three individual images 40', 40", and 40''' of the glass body 20 are captured at three successive rotational positions. For the sake of better clarity, the angle between the respective rotational positions is about 30°, while much smaller angles between the rotational positions are typical in practice.

In the present example, the depth of focus of the imaging device is selectively set such that the entire body is sharply imaged within the capture range. In the example, the depth of focus is 3 cm, in order to be able to sharply image the entire portion of the body that is located in the capture range of the imaging device between the axis of symmetry thereof and the imaging device.

The rotational velocity of the glass body 20 is selected such that the defect appears on a plurality of individual images, that is to say on a plurality of successive images. So, successive images overlap. It has proven to be advantageous if this overlap is at least 50%, preferably at least 60%, and more preferably at least 70%. In the illustrated example, the exemplary defects are imaged differently on three successively captured individual images 40', 40", and 40'''.

In the example, the three images of the glass body 40', 40", and 40''' have defects 45a, 45b, 45c, and 45d, which have different causes and thus belong to different classes. For example, the defect 45a relates to a defect on or in the glass body 20. This may be an adhering or trapped foreign particle.

45b denotes a defect which appears on each individual image 40', 40", and 40''' and is caused by a shadow and/or by reflexes due to the glass body (dashed line). Such defects may be caused, for example, by reflections that are related to the wall thickness of the glass body 20 and/or to the illumination.

The defect 45c indicates a defect in the environment. This may be a lint in the air, for example.

Finally, defect 45d is a defect which is caused by the optical system, i.e. it is located in or on the imaging device 14. This may be a lint adhering on a lens of the imaging device 14, for example.

According to the inventive method it is intended to computationally subtract the images of two successive individual capturings. In this case, only the information from the two images which is not identical will be left for further evaluation. Accordingly, the digital images obtained from two successively captured individual images are compared with each other, and the information which is identical on both images is eliminated, so as to obtain a difference image.

In the illustrated example, therefore, a first subtraction 41' is made in order to generate a difference image 42' from the images of individual capturings 40' and 40". Another subtraction 41" is effected to obtain another difference image 42". This principle is performed for all captured individual images so as to allow for a circumferential examination of the glass body 20.

The generation of the difference image 42', 42" results in a reduction and elimination of system-related defects, that is to say defects which are related to the imaging device 14 or caused by the imaging device or the illumination.

For this purpose, the rotational velocity of the body and the time of the respective capturing of the image are exploited. The velocity of the body's surface with respect to the imaging device 14 is then computationally determined, which approximately corresponds to the trajectory velocity of a point on a trajectory associated with that surface, in order to determine therefrom the lateral offset in two successive images which a defect will have that is located on or in the body to be examined.

This path-time analysis makes it possible to identify features on the images, which have moved in correspondence to the rotational velocity of the body. The presence of such features is therefore caused by the body to be examined, whereas features that have not moved in correlation with the rotational velocity of the body have other causes.

For further analysis, the features exhibiting such a velocity-proportional movement are allowed to pass through a suitable filter algorithm. By contrast, those features which have a different velocity or appear stationary on the individual images are deleted from the image for further analysis.

In the illustrated example, only the defects 45a and 45c are shown on the difference image 42'. In this case, the defect 45a appears twice, since it is imaged at two different positions of the associated individual images 40' and 40" due to the rotation of the glass body 20. In difference image 42", the defect 45a is displayed twice as well, since rotation of the glass body 20 also occurs between the individual images 40" and 40'''. Since the defect 45c does not exist in the two individual images 40" and 40''', it does not appear. The defects 45b and 45d, by contrast, appear at the same position in the respective individual images 40', 40", and 40'''. They are therefore not computationally transferred into the difference images 42' and 42".

The difference images 42', 42" are subsequently cylindrically unfolded computationally, whereupon a feature analysis is performed by suitable algorithms in the computer unit. This unfolded rotation image can subsequently be analyzed for defects.

So-called pseudo defects, i.e. defects caused by something that is not located in or on the body to be examined, can be eliminated in this way. These are pixels or pixel areas in the digital image, which exhibit no lateral offset in correspondence to the path-time analysis, but rather have a greater or smaller or no lateral offset at all in their position between one individual image and a subsequent one.

Therefore, only those defects will be left over for the defect analysis, which are directly related to the body. In this way, a rapid and reliable examination of the body can be executed, which provides information about whether the examined body has a defect or not.

What is claimed is:

1. A method for optical examination of transparent bodies, comprising:
   a) positioning a transparent body with an area to be examined within a capture range of an imaging device;
   b) capturing a first individual image of the body at a first rotational position using the imaging device;
   c) transmitting the individual image to a computer unit as a first digital image;
   d) rotating the body about an axis to a second rotational position;
   e) capturing a second individual image of the body using the imaging device at the second rotational position so that the second individual image at least partially overlaps the first individual image;
   f) transmitting the second individual image to the computer unit as a second digital image;
   g) controlling the computer unit to computationally compare the first and second images to produce a first difference image;
   h) controlling the computer unit to computationally develop the first difference image by cylindrical unfolding to provide a first unfolded difference image;
   i) repeating the steps d) through h) until at least one complete revolution of the body has been completed.

2. The method of claim 1, wherein the body has a rotationally symmetrical shape at least in portions thereof, and wherein the axis of rotation is aligned with the axis of symmetry of the body.

3. The method of claim 1, wherein the body comprises a material selected from a group consisting of plastic, glass, glass ceramic, and borosilicate glass.

4. The method of claim 1, wherein the body is selected from a group consisting of a tubular portion, a rod portion, a container, a packaging, a pharmaceutical packaging, a syringe, a cartridge, a vial, and an ampoule.

5. The method of claim 1, further comprising controlling the computer unit to analyze the difference image by evaluating a lateral offset of a feature in successive images in relation to a rotational velocity of the body.

6. The method of claim 5, further comprising controlling the computer unit to eliminate, in the difference image, features that are located at the same position in successive images.

7. The method of claim 1, further comprising controlling the computer unit to eliminate a motion blur in the difference image.

8. The method of claim 1, wherein the step of rotating the body about the axis comprises rotating by not more than 20°.

9. The method of claim 1, wherein the rotating and capturing steps are simultaneous.

10. The method of claim 1, wherein the imaging device comprises a matrix camera or a multi-line camera.

11. The method of claim 1, further comprising illuminating, using an illumination device, the body during the capturing step.

12. The method of claim 11, wherein the illumination device comprises a beam source which emits electromagnetic radiation in a visible wavelength range and/or in a near IR wavelength range and/or in a near UV wavelength range.

13. The method of claim 11, wherein the illumination device comprises a beam source which emits monochromatic radiation.

14. The method of claim 11, wherein the illumination device comprises a beam source which emits white light.

15. The method of claim 11, wherein the body is diffusely illuminated.

16. The method of claim 1, wherein the second individual image overlaps the first individual image by at least 50%.

17. An inspection device for optical examination of a transparent body, comprising:
    an optical imaging device, wherein the imaging device has a depth of focus on the body that is a function of a wall thickness of the body, and a ratio of the depth of focus to the wall thickness is less than 5;
    a computer unit;
    an illumination device for illuminating the body; and
    a rotating device for rotating the body, wherein the computer unit is configured to control the imaging device, the illumination device, and the rotating device to:
    a) capture a first individual image of the body at a first rotational position using the imaging device;
    b) transmit the individual image to the computer unit as a first digital image;
    c) rotate the body about an axis to a second rotational position;
    d) capture a second individual image of the body using the imaging device at the second rotational position so that the second individual image at least partially overlaps the first individual image.

18. The inspection device of claim 17, wherein the imaging device has a depth of focus on the body that is at least 1 cm.

19. The inspection device of claim 17, wherein the imaging device has a depth of focus on the body that is less than 1 cm.

20. The inspection device of claim 17, wherein the computer unit is further configured to control the imaging device, the illumination device, and the rotating device to:
    e) transmit the second individual image to the computer unit as a second digital image;
    f) compare the first and second images to produce a first difference image;
    g) develop the first difference image by cylindrical unfolding to provide a first unfolded difference image; and
    h) repeat the steps c) through g) until at least one complete revolution of the body has been completed.

21. An inspection device for optical examination of a transparent body, comprising:
    an optical imaging device;
    a computer unit;
    an illumination device for illuminating the body; and
    a rotating device for rotating the body,
    wherein the computer unit is configured to control the imaging device, the illumination device, and the rotating device to:
    a) capture a first individual image of the body at a first rotational position using the imaging device;
    b) transmit the individual image to the computer unit as a first digital image;
    c) rotate the body about an axis to a second rotational position;
    d) capture a second individual image of the body using the imaging device at the second rotational position;
    e) transmit the second individual image to the computer unit as a second digital image;
    f) compare the first and second images to produce a first difference image;
    g) develop the first difference image by cylindrical unfolding to provide a first unfolded difference image; and h) repeat the steps c) through g) until at least one complete revolution of the body has been completed.

\* \* \* \* \*